United States Patent
Lee (10) Patent No.: US 8,253,966 B2
(45) Date of Patent: Aug. 28, 2012

(54) IMAGE FORMING APPARATUS TO PRINT SCANNED DOCUMENTS IN A PREDETERMINED ORDER AND METHOD THEREOF

(75) Inventor: Joo-chul Lee, Suwon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 1315 days.

(21) Appl. No.: 11/374,025

(22) Filed: Mar. 14, 2006

(65) Prior Publication Data

US 2006/0262340 A1 Nov. 23, 2006

(30) Foreign Application Priority Data

May 20, 2005 (KR) .................. 10-2005-0042492

(51) Int. Cl.
  *G06F 15/00* (2006.01)
  *G06K 1/00* (2006.01)
(52) U.S. Cl. ..................... 358/1.18; 358/1.12
(58) Field of Classification Search .............. 358/1.1, 358/1.9, 1.11–1.18
See application file for complete search history.

(56) References Cited

U.S. PATENT DOCUMENTS

| 5,940,583 A * | 8/1999 | Taira et al. ............. 358/1.15 |
| 6,041,165 A * | 3/2000 | Morikawa ............. 358/1.2 |
| 6,195,172 B1 * | 2/2001 | Minamizawa ......... 358/1.15 |
| 2005/0052662 A1 * | 3/2005 | Nishikawa et al. ....... 358/1.2 |

FOREIGN PATENT DOCUMENTS

| JP | 06-181516 | | 6/1994 |
| JP | 09-307675 | | 11/1997 |
| JP | 11-220557 | | 8/1999 |
| JP | 2003-234858 | | 8/2003 |
| JP | 2003234858 A | * | 8/2003 |
| JP | 2004274279 A | * | 9/2004 |

* cited by examiner

*Primary Examiner* — Thierry Pham
(74) *Attorney, Agent, or Firm* — Stanzione & Kim, LLP (57) ABSTRACT

An image forming apparatus having a page sorting function includes a scanning unit to scan a plurality of pages in order, a number recognizing unit to recognize a page number on each of the scanned pages, a control unit to determine whether a current scanned page whose page number is recognized is printable based on a predetermined page sorting order and pre-scanned page numbers, and a printing unit to print the scanned page. By sorting and printing simultaneously, a total amount of time required to perform a copying process can be substantially reduced, and user's convenience is improved.

15 Claims, 5 Drawing Sheets

IMAGE FORMING APPARATUS TO PRINT SCANNED DOCUMENTS IN A PREDETERMINED ORDER AND METHOD THEREOF

CROSS-REFERENCE TO RELATED APPLICATIONS

This application claims benefit under 35 U.S.C. §119 from Korean Patent Application No. 2005-42492, filed on May 20, 2005, the entire content of which is incorporated herein by reference.

BACKGROUND OF THE INVENTION

1. Field of the Invention

The present general inventive concept relates to an image forming apparatus having a page sorting function and a method thereof, and more specifically, to an image forming apparatus capable of printing a plurality of scanned pages in predetermined page numbers and a method thereof.

2. Description of the Related Art

In conventional image forming apparatuses, such as, printers, scanners, copiers, fax machines, multi-function devices, etc., the image forming apparatus having a copy function, e.g., a copier or a multi-function device, can copy a plurality of pages at one time.

In a case of copying or printing the plurality of pages at once, copiers usually print the plurality of pages in the same order as a paper stacking order. Therefore, if documents are staked randomly in page number, an operator (or a user) has to manually collate the copied papers and rearrange the copied papers according to the corrected page numbers.

Japanese Laid-Open Patent Application No. 1999-220557 discloses an image forming apparatus, in which page numbers of individual scanned documents (pages) are recognized using an optical character recognition (OCR) function, and the scanned pages are arranged in ascending order of the page numbers according to the recognized page numbers to be printed in the ascending order of the page numbers. However, since the page sorting and printing jobs have to be executed after storing scan data of every page, it takes a longer period of time to perform a total copying process.

SUMMARY OF THE INVENTION

The present general inventive concept provides an image forming apparatus having a page sorting function, which initiates a print job after checking whether a plurality of scanned pages can be printed in corrected page numbers, thereby eliminating a user's inconvenience in a page sorting operation and minimizing a total amount of time required to scan and print a plurality of pages, and a method thereof.

Additional aspects and advantages of the present general inventive concept will be set forth in part in the description which follows and, in part, will be obvious from the description, or may be learned by practice of the general inventive concept The foregoing and/or other aspects of the present general inventive concept may be achieved by providing an image forming apparatus, which includes a scanning unit to scan a plurality of pages in order, a number recognizing unit to recognize page numbers corresponding to the scanned pages, a control unit to determine whether a current scanned page whose page number is recognized is printable based on a predetermined page sorting order and pre-scanned page numbers (or the recognized page numbers), and a printing unit to print the current scanned page according to the determination of whether the current scanned page is printable.

If the current scanned page is a first page of the plurality of scanned pages in the page sorting order, the control unit may control the printing unit to print the current scanned page.

If the plurality of the scanned pages include a previous page, and the previous page is a page to be printed before to print the current scanned page in the page sorting order, the control unit may decide whether the previous page has been scanned and controls the printing unit to print the current scanned page when the previous page has been scanned and/or printed.

The image forming apparatus may further include a memory unit to store scan data provided by the scanning unit.

If the previous page to the current scanned page is not scanned, the control unit may store the scan data corresponding to the current scanned page in the memory unit.

The control unit may store status information regarding a printing progress status of each of the plurality of pages in the memory unit.

The control unit may control the printing unit to print the plurality of pages according to the page sorting order by using the status information stored in the memory unit.

If one of the plurality of pages is scanned as the current scanned page to be printed, the control unit may search for a subsequent page to the current scanned page among the plurality of scanned pages when the subsequent page has a page number higher than the current scanned page and has already been scanned before the current scanned image is scanned, and if the subsequent page is searched, the control unit may control the printing unit to print the searched subsequent page.

The apparatus may further include a panel unit through which a user selects an operation mode to control the control unit among a normal sorting mode, a user sorting mode, and a normal mode. The control unit may set a page number order from a first to a last of the plurality of pages as the page sorting order if the normal sorting mode is selected, the control unit may set a user input page number order as the page sorting order if the user sorting mode is selected, and the control unit may set a scanning order of the plurality of pages as the page sorting order if the normal mode is selected.

The foregoing and/or other aspects of the present general inventive concept may also be achieved by providing an image forming method of an image forming apparatus to scan a plurality of pages, the method including scanning the plurality of pages in order, recognizing page numbers on each of the scanned pages, if the page number of one of the scanned pages is recognized, determining whether a current scanned page corresponding to the one of the scanned pages is printable based on a predetermined page sorting order and pre-scanned page numbers (or recognized page numbers), and printing the current scanned page if the current scanned page is determined to be printable.

The determining of whether the current scanned page is printable may include printing the current scanned page if the current scanned page is a first page in the page sorting order.

The determining of whether the current scanned page is printable may include if there are one or more previous pages to the current scanned page in the page sorting order, deciding whether the previous pages are scanned, and printing the current scanned page when all the previous pages are already scanned.

The determining of whether the current scanned page is printable may further include if at least one of the previous pages to the current scanned page has not been scanned, storing the current scanned page in a predetermined memory unit.

The method may further include generating status information regarding a printing progress status of each of the plurality of pages, and storing the status information in the memory unit.

The method may further include printing the plurality of pages according to the page sorting order by using the status information stored in the memory unit.

The method may further include searching for a subsequent page to the current scanned page among the pre-scanned pages when the subsequent page has a higher page number than the current scanned page and has already been scanned before the current scanned page is scanned, and if the subsequent page is searched, printing the searched subsequent page.

The method may further include receiving a user input operation mode among a normal sorting mode, a user sorting mode, and a normal mode to control a control unit, setting a page number order from a first to a last of the plurality of pages as the page sorting order if the normal sorting mode is selected, setting a user input page number order as the page sorting order if the user sorting mode is selected, and setting a scanning order of the plural pages as the page sorting order if the normal mode is selected.

The foregoing and/or other aspects of the present general inventive concept may also be achieved by providing image forming apparatus including a scanning unit to scan a plurality of stacked pages in order, a control unit to determine whether a current scanned page, which is one of the plurality of pages, is printable according to a predetermined page sorting order; and a printing unit to print the current scanned page before another one of the plurality of pages is scanned or printed.

The foregoing and/or other aspects of the present general inventive concept may also be achieved by providing image forming apparatus including a scanning unit to scan a plurality of pages in order, a number recognizing unit to recognize a page number on each of the scanned pages, a control unit to determine whether a current scanned page whose page number is recognized is printable based on the recognized page number, and a printing unit to print the scanned pages before another one of the plurality of pages is scanned or printed.

The foregoing and/or other aspects of the present general inventive concept may also be achieved by providing image forming apparatus including a scanning unit to scan a plurality of pages in order, and a printing unit to print one of the plurality of pages, which has been scanned, before the scanning unit scans another one of the plurality of pages, according to page numbers assigned to the plurality of pages.

The foregoing and/or other aspects of the present general inventive concept may also be achieved by providing image forming apparatus including a scanning unit to scan a plurality of pages in order, and a control unit to determine whether each one of the scanned pages is printable when each one of the plurality of page is scanned by the scanning unit, according to page numbers corresponding to the plurality of pages.

The foregoing and/or other aspects of the present general inventive concept may also be achieved by providing image forming apparatus including a scanning unit to scan a first page having a first page number, a second page having a third page number, and a third page having a second page number in order, a control unit to determine whether the scanned first page is printable according to a predetermined page sorting order, and a printing unit to print the scanned first page before the scanning unit scans one of the second and third pages.

The foregoing and/or other aspects of the present general inventive concept may also be achieved by providing image forming apparatus including a scanning unit to scan a plurality of pages having a second page number, a first page number, and a third page number in order, and a control unit to determine that the scanned pages having the first and second page numbers are printed before the scanning unit completes the scanning of one of the pages having the third page number.

The foregoing and/or other aspects of the present general inventive concept may also be achieved by providing image forming apparatus including a scanning unit to scan a plurality of stacked pages having a first page number, a third page number, and a second page number, and a fourth page number in order, and a control unit to determine that the scanned pages having the first page number, the second page number, and the third page number are printed regardless of whether one of the stacked pages having the fourth page number is not scanned yet.

The foregoing and/or other aspects of the present general inventive concept may also be achieved by providing image forming apparatus including a scanning unit to scan a plurality of stacked pages, and a control unit to compare a page number of each of the scanned pages with a predetermined sort order when the each of the scanned pages is scanned, and to determine that the each of the scanned pages is printed according to each comparison between the page number and the each predetermined sort order.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
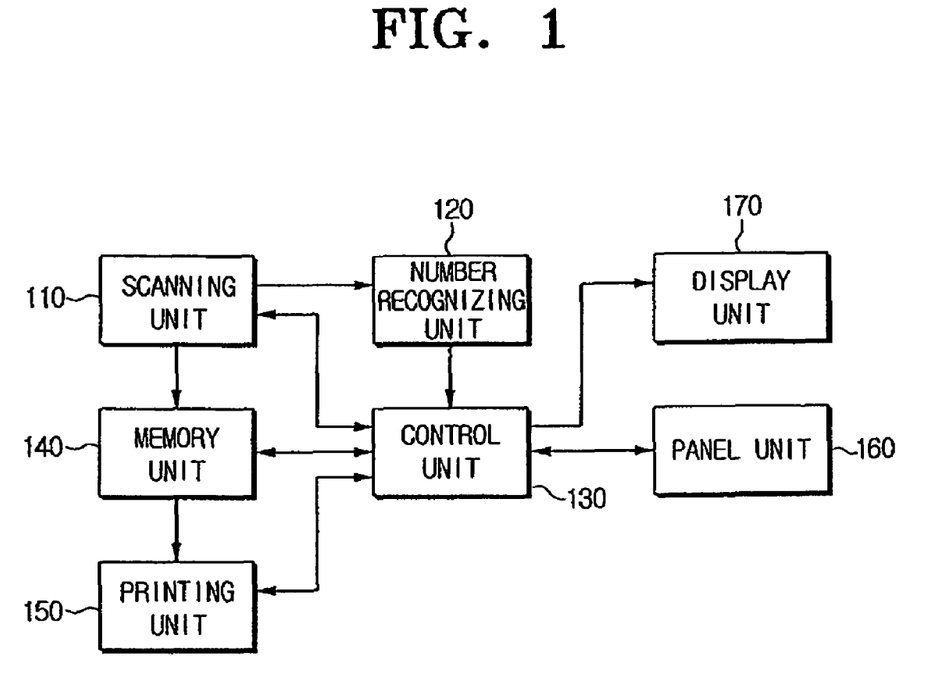
FIG. 1 is a block diagram illustrating an image forming apparatus according to an embodiment of the present general inventive concept.

FIG. 1 is a block diagram illustrating an image forming apparatus according to an embodiment of the present general inventive concept. According to FIG. 1, the image forming apparatus includes a scanning unit 110, a number recognizing unit 120, a control unit 130, a memory unit 140, a printing unit 150, a panel unit 160, and a display unit 170.

The scanning unit 110 generates scan data by scanning documents. For instance, when a user stacks a plurality of documents (or pages) onto an automatic document feeder disposed outside or inside a main body of the image forming apparatus, the scanning unit 110 scans each page of the documents in a stacking order to generate scan data.

The scan data provided by the scanning unit 110 are stored in the memory unit 140.

The number recognizing unit 120 recognizes a page number marked on a specific area on each scanned page. The number recognizing unit 120 recognizes the page numbers of the respective pages using an optical character recognition (OCR) function. The image forming apparatus may use OCR software to analyze a scanned image by dividing the scanned image into a bright portion and a dark portion, and if the scanned image is recognized as a character, the scanned image having a text image corresponding to the character is converted into a string of ASCII codes. As such, scan images are converted into text characters. Here, the user arbitrarily designates an area on a page for the number recognizing unit 120 to be able to read the page number within the designated area. Since page numbers may not be written at the same location for all types of documents, the user may need to input location information (horizontal and vertical coordinates) of a page number area on a page to be scanned. For example, the designated area including the page number may be a bottom, a top, a right side, a left side, or a center of the respective pages. Consequently, this reduces an amount of time required to read the page numbers.

The control unit 130 determines whether to print a current scanned page according to the page number recognized by the number recognizing unit 120, a page number of a post-scanned page, and/or a predetermined page sorting order.

For instance, if a page 1 is scanned, the control unit 130 decides whether the scanned page 1 corresponds to the first page of the plurality of pages in the page sorting order. If the scanned page 1 corresponds to the first page of the plurality of pages in the page sorting order, the scanned page 1 is ready to be printed right away. On the other hand, if the scanned page 1 is not the first page, the control unit 130 decides whether a previous page to the page 1 in the page sorting order has already been scanned. Here, the previous page may have a page number lower than that of the scanned page 1. That is, the previous page needs to be printed before the scanned page 1 is printed. If the previous page has been scanned and/or printed, the scanned page 1 should be printed because the scanned page 1 should be printed according to the page sorting order. However, in a case there is a page 2 that has not been scanned as the previous page having a page number which is a lower number than that of the scanned page 1, the scanned page 1 is stored in the memory unit 140. If the scanned page 1 is printed before the previous page having a low page number, it may not comply with the page sorting order, and the printed pages may not be in a desired order. Therefore, the scanned page 1 remains in a standby state until the page 2 is scanned. Therefore, the scanned page 1 is not printed until the page 2 is scanned and printed out first. In this manner, pages are printed according to the sorting order.

Moreover, the control unit 130 generates status information regarding the printing progress status of each page and stores the status information in the memory unit 140. The control unit 130 determines a storage area corresponding to each page with reference to the predetermined page sorting order, and stores the status information of each page in the determined area.

Here, the status information may contain index information of individual pages, address information on an area of the memory 140 where the scanned data is stored, status flag information indicating whether a page of interest can be printed, print history flag information indicating whether a page of interest has been printed, etc. The status flag information and the print history flag information may be indicated as 0 or 1. For example, in a case that a page is determined to be printable, the control unit 130 sets the status flag information of the page to 1 (i.e., ON state). In a case of a page in the standby state, the control unit 130 sets the status flag information to 0 (i.e., OFF state). In a case of a printed page, the control unit 130 sets the print history flag information to 1 (i.e., ON state). Lastly, in a case of an unprinted page, the control unit 130 sets the print history flag information to 0 (i.e., OFF state).

The printing unit 150 executes a print job according to the status information of each page. The printing unit 150 prints pages whose status flag information is in the ON state, and does not print pages whose status flag information is in the OFF state. If the status flag information is in the ON state, the printing unit 150 checks the address information, reads the scan data of a corresponding page from a designated area of the memory unit 140 according to the address information, and performs the printing operation. In a case of a page whose print history flag information is in the ON state, a printing job is omitted to ovoid duplicate printing.

The panel unit 160 enables the user to select an operation mode of the control unit 130. The control unit 130 sets the page sorting order, depending on the user-selected operation mode.

The control unit 130 may be operated in one of a normal sorting mode, a user sorting mode, and a normal mode. In the normal sorting mode, the control unit 130 sets a page sorting order according to page numbers from the first through last pages of one or more documents (pages). In this case, the control unit 130 displays a message on the display unit 170 so that the user can input a total number of pages and the page number on the first page. As the user inputs the total number of pages and the page number on the first page through the panel unit 160, the control unit 130 sets the page sorting order based on the user input information. For example, suppose that the user input '10' as the total number of scanned pages and '1' as the page number on the first page. Then, the control unit 130 sets the page sorting order in ascending order from 1 to 10. Alternatively, the control unit 130 may display a message through the display unit 170, so that the user can input the page number on the first page and the page number on the last page. As the user inputs the first page number and the last page number through the panel unit 160, the control unit 130 sets the page sorting order based on the user input information. For instance, suppose that the user input '11' for the first page number and '20' for the last page number. Then, the control unit 130 sets the page sorting order in ascending order from 11 to 20.

In the user sorting mode, the control unit 130 displays a message through the display unit 170, so that the user can input a page number order. As the user inputs the page number order through the panel unit 160, the control unit 130 sets the page sorting order based on the input page number order.

In the normal mode, the control unit 130 sets the page scanning order as the page sorting order.

Figure 2:
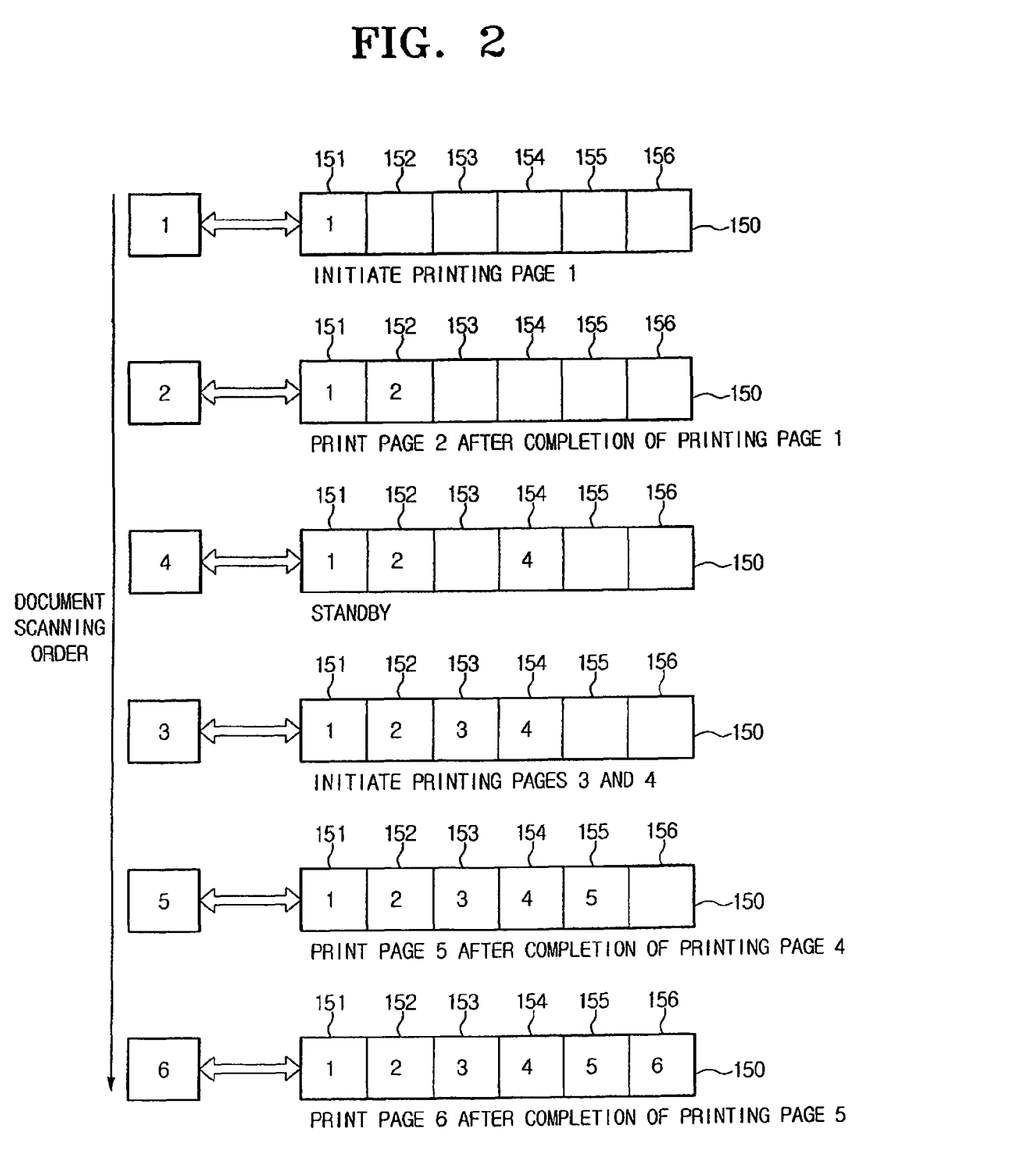
FIG. 2 is a view illustrating a page data processing procedure in a given scanning order used in the image forming apparatus of FIG. 1.

FIG. 2 is a view illustrating a page data processing procedure in a given scanning order used in the image forming apparatus of FIG. 1 and a sorting order in which a plurality of pages are sorted and printed using the control unit 130 of the image forming apparatus. Referring to FIGS. 1 and 2, a total of 6 pages are scanned in order of 1, 2, 4, 3, 5 and 6. Suppose that the control unit 130 is operated in the normal sorting mode. Then, a page 1, which is the first page, can be printed immediately after it is scanned. In this case, the control unit 130 sets the status flag information and the print history flag information to the ON state. The status information is stored in a first storage area 151 on the memory unit 140.

Next, when a page 2 is scanned, the status flag information is set to the ON state because a previous page, i.e., the page 1, is already scanned. The scan data of the page 2 is stored in a second storage area 152. The status flag information is set to the ON state. Therefore, when the printing operation on the page 1 is completed, the printing unit 150 checks the status flag information of the second storage area 152. After recognizing that the status flag information in the second storage area is the ON state, the printing unit 150 initiates the printing operation on the page 2. When the page 2 is also printed completely, the print history flag information is set to the ON state.

Next, when a page 4 is scanned, the status flag information is set to the OFF state since a page 3, which is a previous page to a page 4, is not scanned yet. Thus, the control unit 130 stores status information of the page 4 in a fourth storage area 154, and sets the status flag information to the OFF state. Because the third and fourth storage areas 153 and 154 do not have any data yet or the status flag information thereof is set to the OFF state, the printing unit 150 stops the printing operation to print the scanned page 4 after printing the page 2, and enters to the standby mode.

When the page 3 is scanned, the status flag information is set to the ON state and the scanned page 3 is immediately printed because its previous pages, i.e., page 1 and page 2, have been already scanned. The status information of the page 3 is stored in the third storage area 153. In this case, the control unit 130 searches for a subsequent page of the page 3 among the scanned pages. According to FIG. 2, the page 4 is the subsequent page of the page 3. Therefore, the page 4 is searched by the control unit 130 and the status flag information of page 4 is set to the ON state. In this manner, the printing unit 150 prints the pages 3 and 4 in sequence.

When a page 5 and a page 6 are sequentially scanned, the control unit 130 stores each page in fifth and sixth storage areas 155 and 156 in order, and controls the printing unit 150 to print data corresponding to the pages 5 and 6.

If the control unit 130 is operated in the user sorting mode and the user sets a sequence of the plurality of pages in the order of 3, 1, 2, 4, 6, and 5, Then, the control unit 130 sets this user-designated order as the page sorting order, and determines whether the pages are printable according to the sorting order being set. When a page 3 is scanned, data corresponding to the scanned page 3 is not printed but stored. When pages 1 and 2 are scanned after the page 3 has been scanned and stored, data corresponding to the pages 1, 2, and 3 may be printed Because the other operations of the procedure are basically the same as in the normal sorting mode, the description thereof is omitted hereafter.

Figure 3:
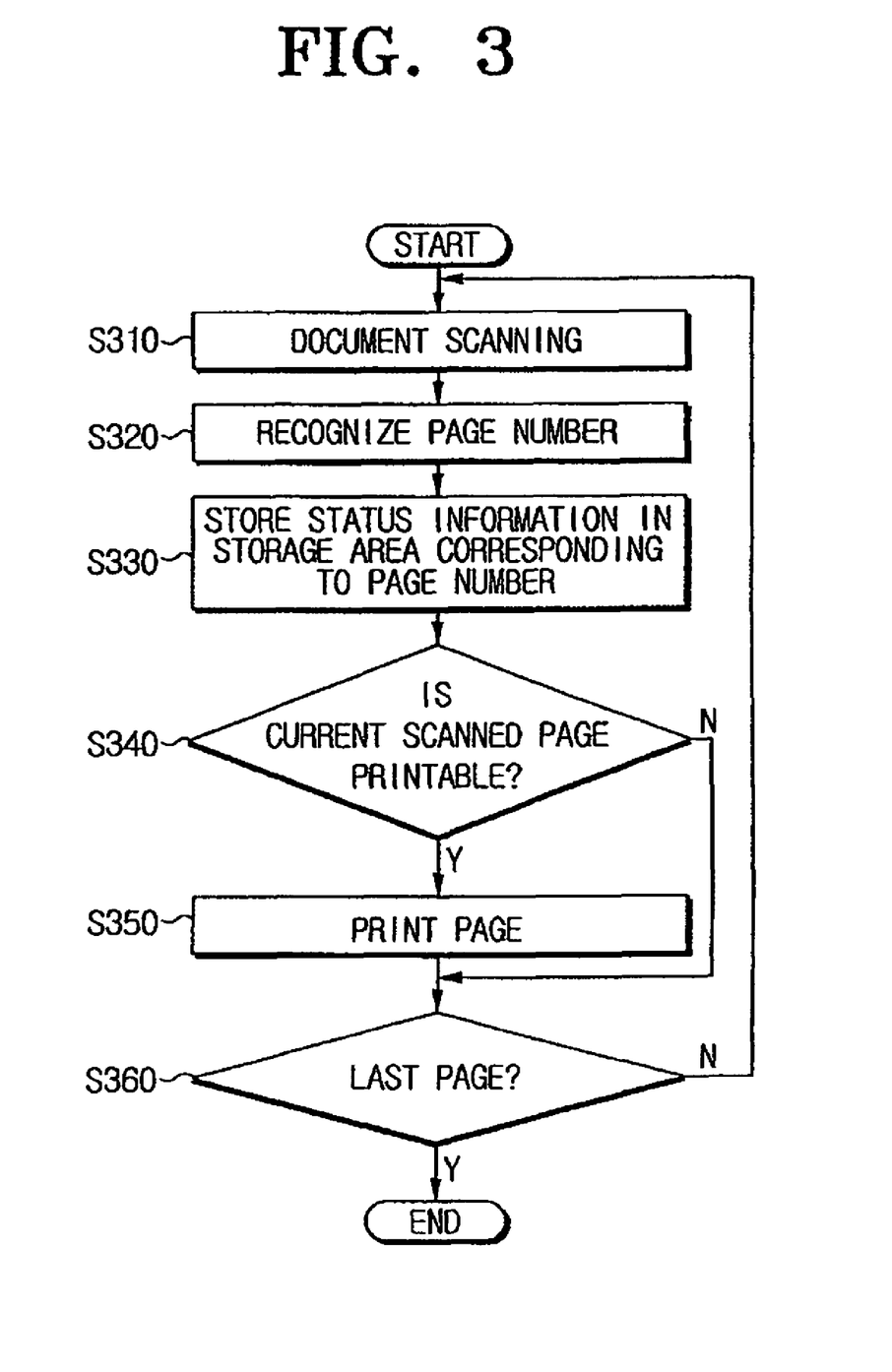
FIG. 3 is a flow chart illustrating an image forming method according to an embodiment of the present general inventive concept.

FIG. 3 is a flow chart illustrating an image forming method according to an embodiment of the present general inventive concept. Referring to FIGS. 1 and 3, when a page is scanned (S310), an image forming apparatus recognizes a page number on the corresponding page (S320). Then, the image forming apparatus stores the scan data and status information of the page in the memory unit 140 (S330).

Next, the image forming apparatus decides whether a current scanned page is printable, referring to a predetermined page sorting order and the page numbers on pre-scanned pages (S340). If the current scanned page is printable (S340), the image forming apparatus executes a print job (S350). If the current scanned page is not printable (S340), the image forming apparatus is maintained in the (printing) standby mode.

Lastly, the image forming apparatus decides whether all pages up to the last one are scanned (S360) and repeats the above-described procedure until the last page is scanned. In this embodiment of FIG. 3, the status information was first stored and a decision regarding whether a page of interest is printable was made next. Depending on the decision result, the status flag information was set lastly. It is possible that a decision regarding whether a page of interest is printable can be made first, and the status information including the status flag information can be stored later.

Figure 4:
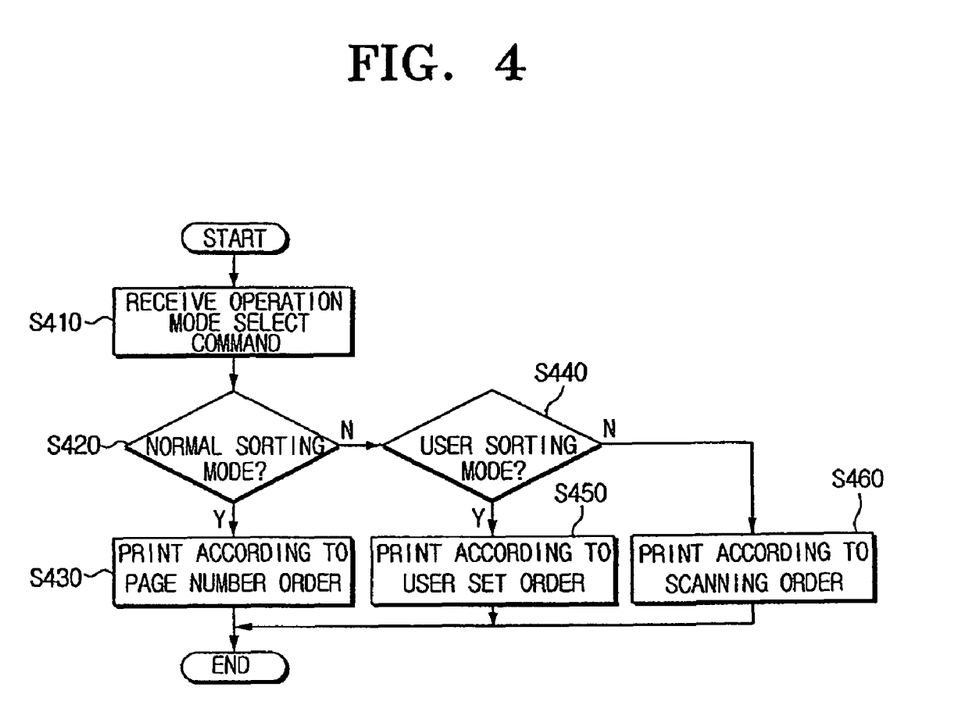
FIG. 4 is a flow chart illustrating a method of setting an operation mode in an image forming apparatus according to an embodiment of the present general inventive concept.

FIG. 4 is a flow chart illustrating a method of setting an operation mode of an image forming apparatus according to an embodiment of the present general inventive concept. Referring to FIGS. 1 and 4, when a user inputs an operation mode select command for selecting a predetermined operation mode through the panel unit 160 (S410), the image forming apparatus decides whether the normal sorting mode is selected (S420). If the operation mode is set to the normal sorting mode (S420), the image forming apparatus sequentially print pages according to the page numbers (S430).

On the other hand, if the operation mode is set to the user sorting mode (S440), the image forming apparatus sorts and prints the pages according to the page number order the user input (S450).

If neither one of the normal sorting mode and the user sorting mode is selected (S440), the image forming apparatus operates in the normal mode, that is, it prints the pages according to the scanning order (S460).

Figure 5:
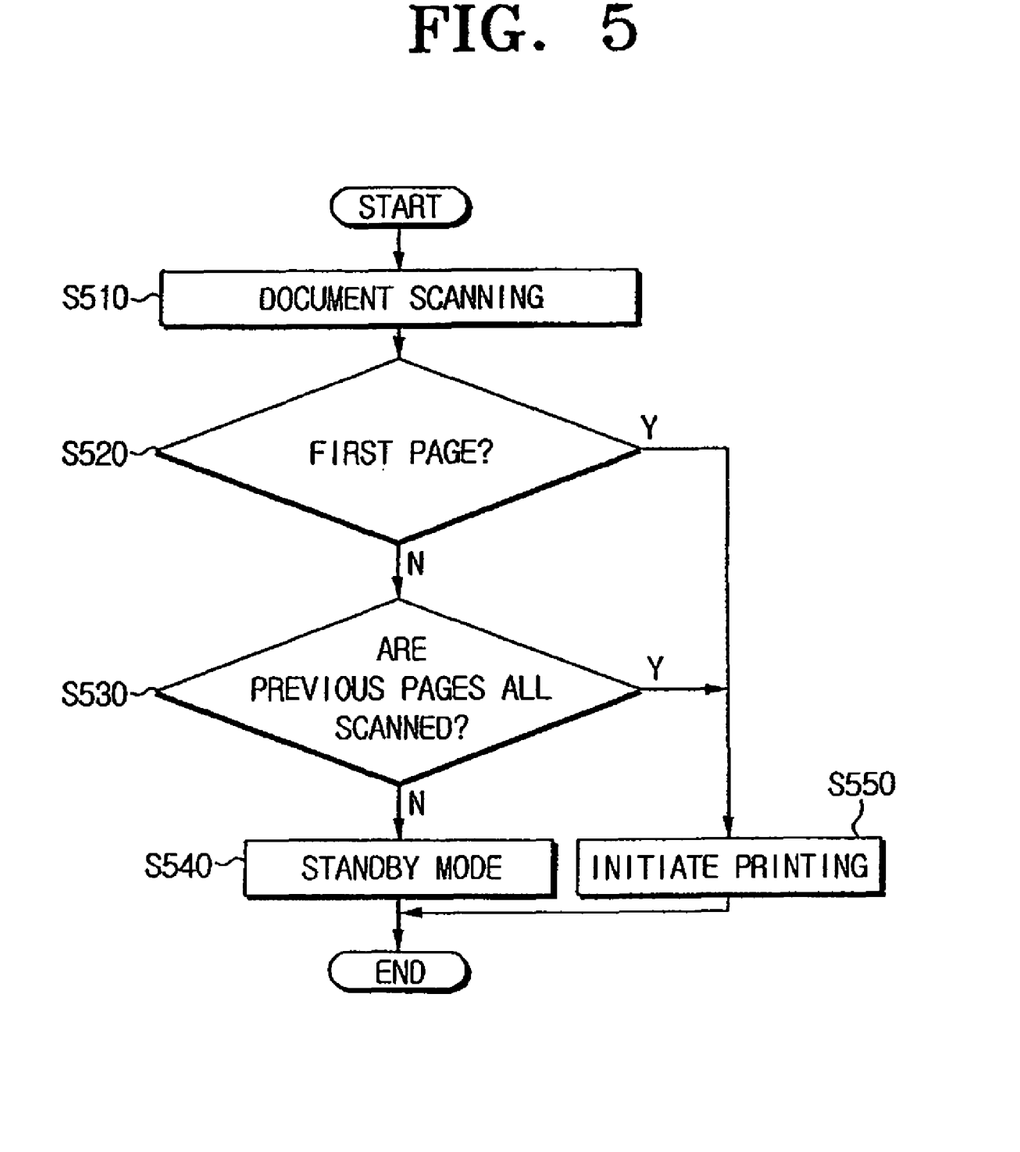
FIG. 5 is a flow chart illustrating a method of determining whether a current scanned page can be printed by an image forming apparatus according to an embodiment of the present general inventive concept.

FIG. 5 is a flow chart illustrating a method of determining whether a current scanned page is printable in an image forming apparatus according to an embodiment of the present general inventive concept. Referring to FIG. 5, when a page is scanned (S510), the image forming apparatus decides whether a current scanned page is the first page (S520). If the current scanned page is the first page (S520), the image forming apparatus makes a print decision and executes the printing operation right away (S550).

On the other hand, if the current scanned page is not the first page (S520), the image forming apparatus decides whether its previous pages are all scanned already (S530). If all of the previous pages were scanned (S530), the image forming makes a print decision and executes the printing operation (S550). However, if there is at least one page that is not scanned among the previous pages (S530), the image forming apparatus enters to the (printing) standby mode (S540). In this case, the status flag information is set to an OFF state and the operation of the printing unit 150 is interrupted.

As explained above, the image forming apparatus of the present embodiment first checks whether scanned pages (or documents) can be printed according to their scanning order before executing the printing operation. In this manner, page sorting and printing operations can be performed simultaneously, and the total amount of time that usually takes for the scanning and printing processes can be substantially reduced, thereby reducing the user's manual operation of rearranging pages in correct order.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
a scanning unit to scan a plurality of pages in order, each of the plurality of pages having a page number printed thereon, the page numbers forming a continuous group of numbers;
a number recognizing unit to recognize the page number on each of the scanned pages;
a memory unit to store the scanned pages provided by the scanning unit;
a printing unit to print the scanned pages; and
a control unit to determine whether pages previous to a current scanned page in a predetermined page sorting order based on the page numbers of the plurality of pages have been scanned, and if the pages previous to the current scanned page in the predetermined page sorting order have been scanned, to control the printing unit to print the current scanned page while the scanning of the plurality of pages is ongoing.

2. The apparatus of claim 1, wherein, if the current scanned page is a first page of the plurality of pages in the page sorting order, the control unit controls the printing unit to print the current scanned page.

3. The apparatus of claim 1, wherein, if the pages previous to the current scanned page are not scanned, the control unit stores the current scanned page in the memory unit.

4. The apparatus of claim 3, wherein the control unit stores status information regarding a printing progress status of each of the plurality of pages in the memory unit.

5. The apparatus of claim 4, wherein the control unit controls the printing unit to print the scanned pages according to the page sorting order according to the status information stored in the memory unit.

6. The apparatus of claim 5, wherein, if the current scanned page is scanned, the control unit searches for a subsequent page to the current scanned page among the scanned pages, and if the subsequent page is searched, the control unit controls the printing unit to print the searched subsequent page.

7. The apparatus of claim 6, further comprising:
a panel unit through which a user selects one of a normal sorting mode, a user sorting mode, and a normal mode as an operation mode of the control unit to print each of the scanned pages; and
wherein, the control unit sets a page number order from a first to a last of the plurality of pages as the page sorting order if the normal sorting mode is selected, the control unit sets a user input page number order as the page sorting order if the user sorting mode is selected, and the control unit sets a scanning order of the plurality of pages as the page sorting order if the normal mode is selected.

8. An image forming method of an image forming apparatus to scan a plurality of pages, the method comprising:
scanning a plurality of pages in order, each of the plurality of pages having a page number printed thereon, the page numbers forming a continuous group of numbers;
recognizing the page numbers on each of the scanned pages;
storing the scanned pages in a predetermined memory unit;
determining whether pages previous to a current scanned page in a predetermined page sorting order based on the page numbers of the plurality of pages have been scanned; and
printing the current scanned page while the scanning of the plurality of pages is ongoing if the pages previous to the current scanned page in the predetermined page sorting order have been scanned.

9. The method of claim 8, further comprising:
determining whether the current scanned page is a first page of the pages in the page sorting order and printing the current scanned page while the scanning of the plurality of pages is ongoing if the current scanned pages is the first page of the pages in the page sorting order.

10. The method of claim 8, wherein the storing the scanned pages comprises:
if at least one of the previous pages to the current scanned page is not scanned, storing data corresponding to the current scanned page in a predetermined memory unit.

11. The method of claim 10, further comprising:
generating status information regarding a printing progress status of each of the plurality of pages; and
storing the status information in the memory unit.

12. The method of claim 11, further comprising:
printing the scanned pages according to the page sorting order according to the status information stored in the memory unit.

13. The method of claim 12, further comprising:
searching for a subsequent page to the current scanned page among the scanned pages; and
if the subsequent page is searched, printing the searched subsequent page.

14. The method of claim 13, further comprising:
receiving a user input operation mode among a normal sorting mode, a user sorting mode, and a normal mode to control a printing operation of a control unit;
if the normal sorting mode is selected, setting a page number order from a first to a last of the plurality of pages as the page sorting order;
if the user sorting mode is selected, setting a user input page number order as the page sorting order; and
if the normal mode is selected, setting a scanning order of the plurality of pages as the page sorting order.

15. An image forming apparatus, comprising:
a scanning unit to scan a plurality of pages in order, each of the plurality of pages having a page number printed thereon, the page numbers forming a continuous group of numbers;
a number recognizing unit to recognize a page number on each of the scanned pages;
a memory unit to store the scanned pages provided by the scanning unit;
a control unit to determine whether pages previous to a current scanned page in a predetermined page sorting order based on the page numbers of the plurality of pages have been scanned; and
a printing unit to print the current scanned page before another one of the plurality of pages is scanned or printed if the pages previous to the current scanned pages in the predetermined page sorting order have been scanned.

* * * * *